(12) United States Patent
Osada et al.

(10) Patent No.: US 11,874,583 B2
(45) Date of Patent: Jan. 16, 2024

(54) DISPLAY DEVICE, CONTROL METHOD THEREFOR, AND IMAGING DEVICE

(71) Applicant: CANON KABUSHIKI KAISHA, Tokyo (JP)

(72) Inventors: Yoichi Osada, Kanagawa (JP); Takashi Miyazaki, Tokyo (JP); Koichi Odagaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/988,818

(22) Filed: Nov. 17, 2022

(65) Prior Publication Data
US 2023/0070780 A1 Mar. 9, 2023

Related U.S. Application Data

(63) Continuation of application No. PCT/JP2021/015863, filed on Apr. 19, 2021.

(30) Foreign Application Priority Data

Jun. 3, 2020 (JP) .................. 2020-096606

(51) Int. Cl.
*G03B 13/06* (2021.01)
*H04N 23/63* (2023.01)
*G01S 17/36* (2006.01)

(52) U.S. Cl.
CPC .............. *G03B 13/06* (2013.01); *G01S 17/36* (2013.01); *H04N 23/63* (2023.01); *H04N 23/631* (2023.01)

(58) Field of Classification Search
CPC ........ G03B 13/02; G03B 13/06; H04N 23/63; H04N 23/631; G01S 17/36
See application file for complete search history.

(56) References Cited

U.S. PATENT DOCUMENTS

| 5,563,676 A | * | 10/1996 | Kosaka | ................... G02B 7/28 396/51 |
|---|---|---|---|---|
| 8,860,870 B2 | | 10/2014 | Nakamaru | |
| 11,146,730 B2 | | 10/2021 | Aoki | |

FOREIGN PATENT DOCUMENTS

| JP | 57-173824 A | 10/1982 |
|---|---|---|
| JP | 02-66530 A | 3/1990 |

(Continued)

OTHER PUBLICATIONS

The foreign references 1-3 and 5-6 were cited in the International Search Report dated Jun. 29, 2021 of International Application No. PCT/JP2021/015863.

*Primary Examiner* — Minh Q Phan
(74) *Attorney, Agent, or Firm* — Cowan, Liebowitz & Latman, P.C.

(57) ABSTRACT

An imaging device includes a composite display device capable of switching between an electronic viewfinder function and a sighting device function. The composite display device includes an eye window and an object window, an organic EL panel that displays a sighting mark that is an indicator, and a photochromic mirror that is a reflective optical element for guiding the indicator to the eye window. A determination unit determines a subject, and a distance-measuring unit measures a distance to the subject. A body control unit controls the organic EL panel, and a photochromic mirror control unit controls a state and a shape of the photochromic mirror. The body control unit performs control for adjusting the projected position of the sighting mark on the basis of distance information of the subject.

4 Claims, 9 Drawing Sheets

(56) References Cited

FOREIGN PATENT DOCUMENTS

| | | |
|---|---|---|
| JP | 2006-267380 A | 10/2006 |
| JP | 2015-141296 A | 8/2015 |
| WO | 2013/047482 A1 | 4/2013 |
| WO | 2019/087928 A1 | 5/2019 |

* cited by examiner

DISPLAY DEVICE, CONTROL METHOD THEREFOR, AND IMAGING DEVICE

CROSS-REFERENCE TO RELATED APPLICATIONS

This application is a Continuation of International Patent Application No. PCT/JP2021/015863, filed Apr. 19, 2021, which claims the benefit of Japanese Patent Application No. 2020-096606, filed Jun. 3, 2020, both of which are hereby incorporated by reference herein in their entirety.

BACKGROUND OF THE INVENTION

Field of the Invention

The present invention relates to a display device capable of projecting and displaying an indicator such as a sighting mark, and an imaging device including the display device.

Background Art

In a case where a subject is a moving object such as a bird or an airplane that is far from an imaging device, the subject may be imaged by using a sighting device called a dot sight provided in the imaging device. In an imaging device having a high-magnification lens, a display device such as an electronic viewfinder is mounted to enable stable imaging. Patent Literature 1 discloses an imaging device having an electronic viewfinder and a sighting device. An optical element of a sighting device can be popped up from a main body of an imaging device independently of a light emitting unit, and the parallax can be corrected by vertically moving a sighting light source with respect to the main body.

CITATION LIST

Patent Literature

Patent Literature 1 Japanese Patent Laid-Open No. 2015-141296

However, in the conventional technique disclosed in Patent Literature 1, the sighting device function and the electronic viewfinder function are realized by using separate devices. Thus, a display panel of the electronic viewfinder formed of an organic electroluminescence (EL) panel or the like cannot be used as a light source when the sighting device is used. In parallax correction performed by adjusting a position of a sighting light source (an indicator of a sighting device) according to a distance from an imaging device to a subject (subject distance), a user needs to manually operate the sighting light source with a dial or the like, and thus the adjustment is troublesome. That is, automatic position adjustment is preferred.

SUMMARY OF THE INVENTION

An object of the present invention is to provide a display device capable of automatically adjusting a projected position of an indicator according to a distance to a subject, and an imaging device including the display device.

According to an embodiment of the present invention, there is provided a device including an object window and an eye window; a display unit that displays an indicator; a reflective optical element that guides the indicator to the eye window; a measuring unit that measures a distance to a subject; and a first control unit that adjusts a display position of the indicator according to the distance to the subject measured by the measuring unit.

According to the present invention, it is possible to automatically adjust a projected position of an indicator according to a distance to a subject.

Further features of the present invention will become apparent from the following description of exemplary embodiments with reference to the attached drawings.

DESCRIPTION OF THE EMBODIMENTS

First Embodiment

Figure 1A:
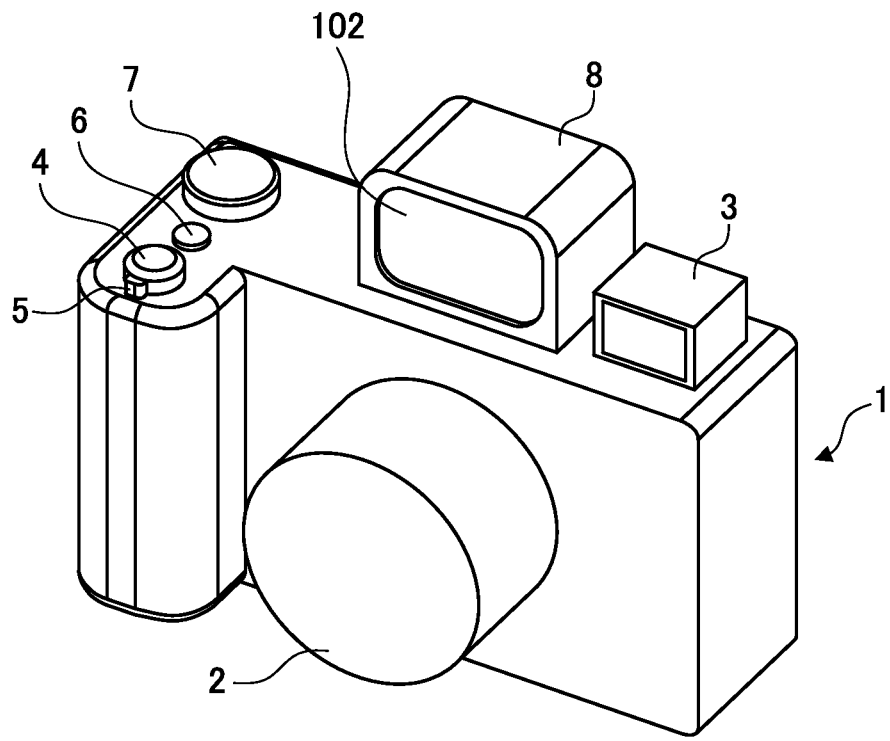
FIGS. 1A and 1B are external perspective views of an imaging device provided with a display device according to the present invention.
Figure 1B:
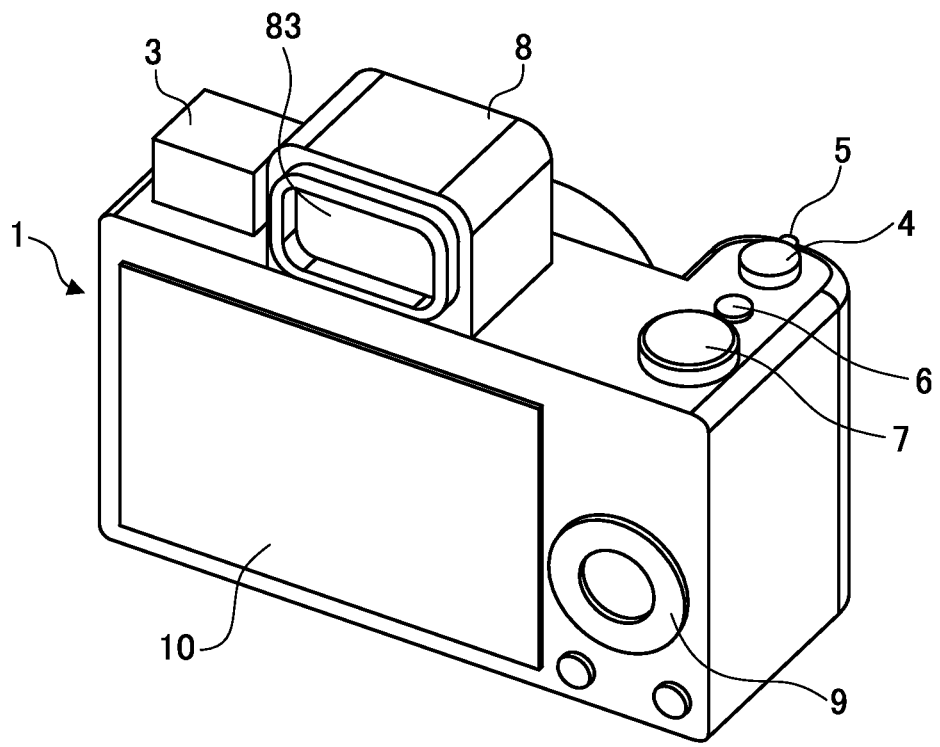

Preferred embodiments of the present invention will be described in detail below on the basis of the accompanying drawings. A configuration of an imaging device 1 of the present embodiment will be described with reference to FIGS. 1A to 2B. FIG. 1A is a perspective view of the imaging device 1 viewed from the front surface, and FIG. 1B is a perspective view of the imaging device 1 viewed from a rear surface. In the following description, a positional relationship between each of parts will be described with a subject side as a front side.

The imaging device 1 has a collapsible lens barrel unit 2 on the front side. The lens barrel unit 2 has an imaging lens forming an image of a subject on an imaging element, and is extended from a main body of the imaging device 1 during imaging, and stored in the main body when retracted. A strobe device 3 is provided on the upper part of the imaging device 1, and a light source emits light to irradiate a subject with illumination light during imaging, and thus the imaging can be performed with proper exposure even in a dark environment.

Various operating members are disposed on an upper surface of the imaging device 1. A release button 4 is configured to be pressed and operated in two stages. When a user performs a half-push operation (SW1) on the release button 4 at the first stage, an imaging preparation operation (a photometry operation, a distance-measuring operation, or the like) is started. Next, when the user performs a full-push operation (SW2) on the release button 4, image data of the subject is recorded on a recording medium built into the imaging device 1 after the subject is started to be imaged.

A zoom lever 5 is a rotary operation lever disposed on the outer periphery of the release button 4. By rotating the zoom lever 5 in a first direction, the imaging lens is zoomed to a telephoto side (a direction in which an angle of view is decreased), and by rotating the zoom lever 5 in a second direction, the imaging lens is zoomed to a wide-angle side (a direction in which the angle of view is increased).

A power button 6 has a push button switch. When the power button 6 is pushed, the imaging device 1 transitions from an unusable state (off state) to a usable state (on state), or transitions from the usable state to the unusable state.

A mode setting dial 7 is a rotary operation member, and a plurality of icons (not illustrated) corresponding to various imaging modes are printed on its top surface. By aligning a desired icon with an indicator (not illustrated) provided on the imaging device 1, the user can perform an operation of setting any of various modes or the like corresponding to the icon.

The imaging device 1 has a composite display device 8 on its upper part. The composite display device 8 has a configuration capable of switching between an electronic viewfinder function and a sighting device function. The composite display device 8 has an object window 102 on the front side and an eye window 83 on the rear side. As illustrated in FIG. 1B, an operation button 9 and a display device 10 are provided on the rear surface of the imaging device 1. The operation button 9 has a single push button, a cross button, and the like. The operation button 9 is assigned with a plurality of functions according to operations, and is used when inputting various instructions such as changing imaging conditions and switching to a reproduction mode of image data recorded on the recording medium 23.

The display device 10 has a display, a touch panel, and the like. A liquid crystal display or the like is used as a display, and is, like an electronic viewfinder, used for checking an image of a subject that is an imaging target or a captured image.

Figure 2A:
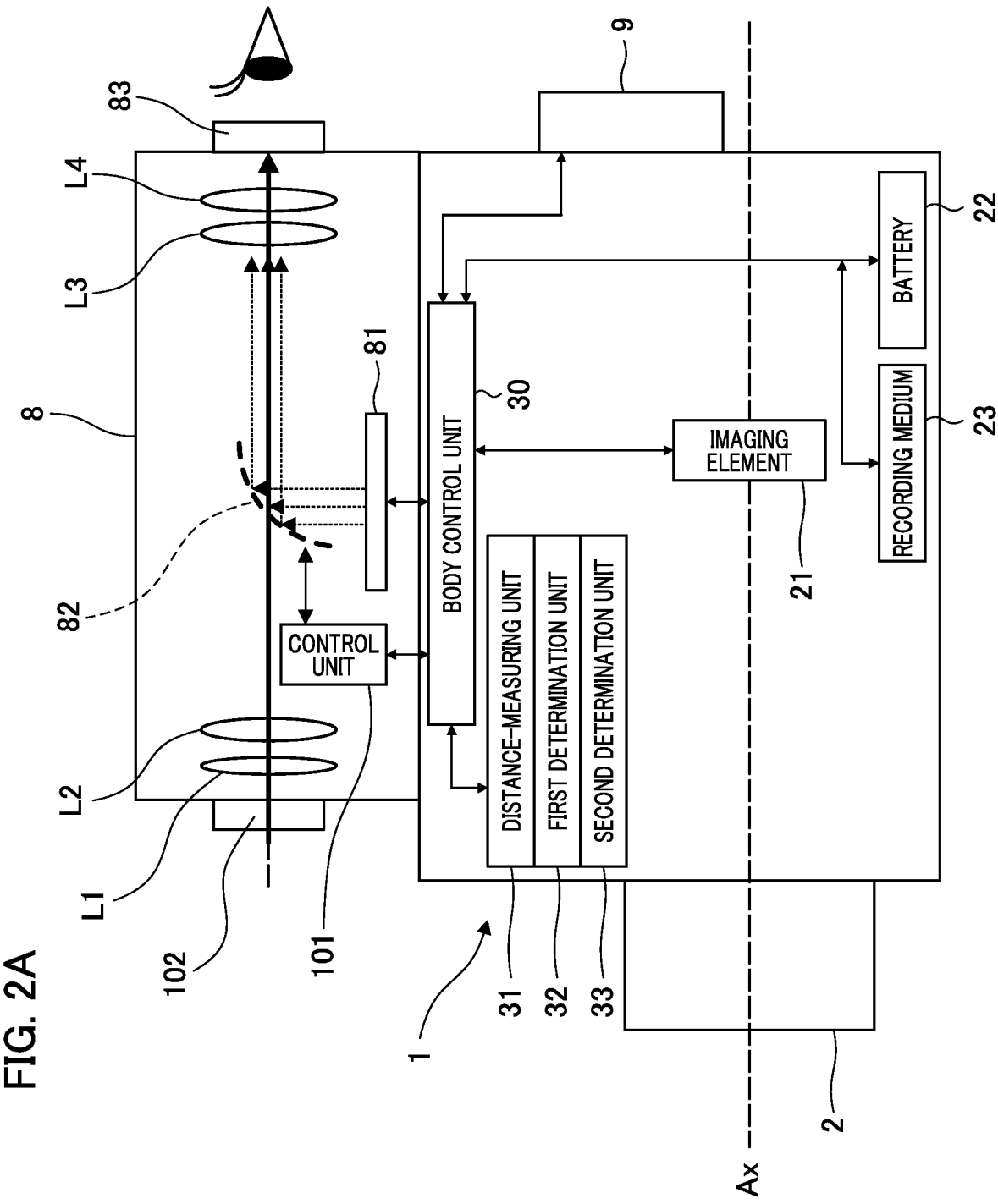
FIGS. 2A and 2B are block diagrams illustrating a configuration example of the imaging device of a first embodiment.
Figure 2B:
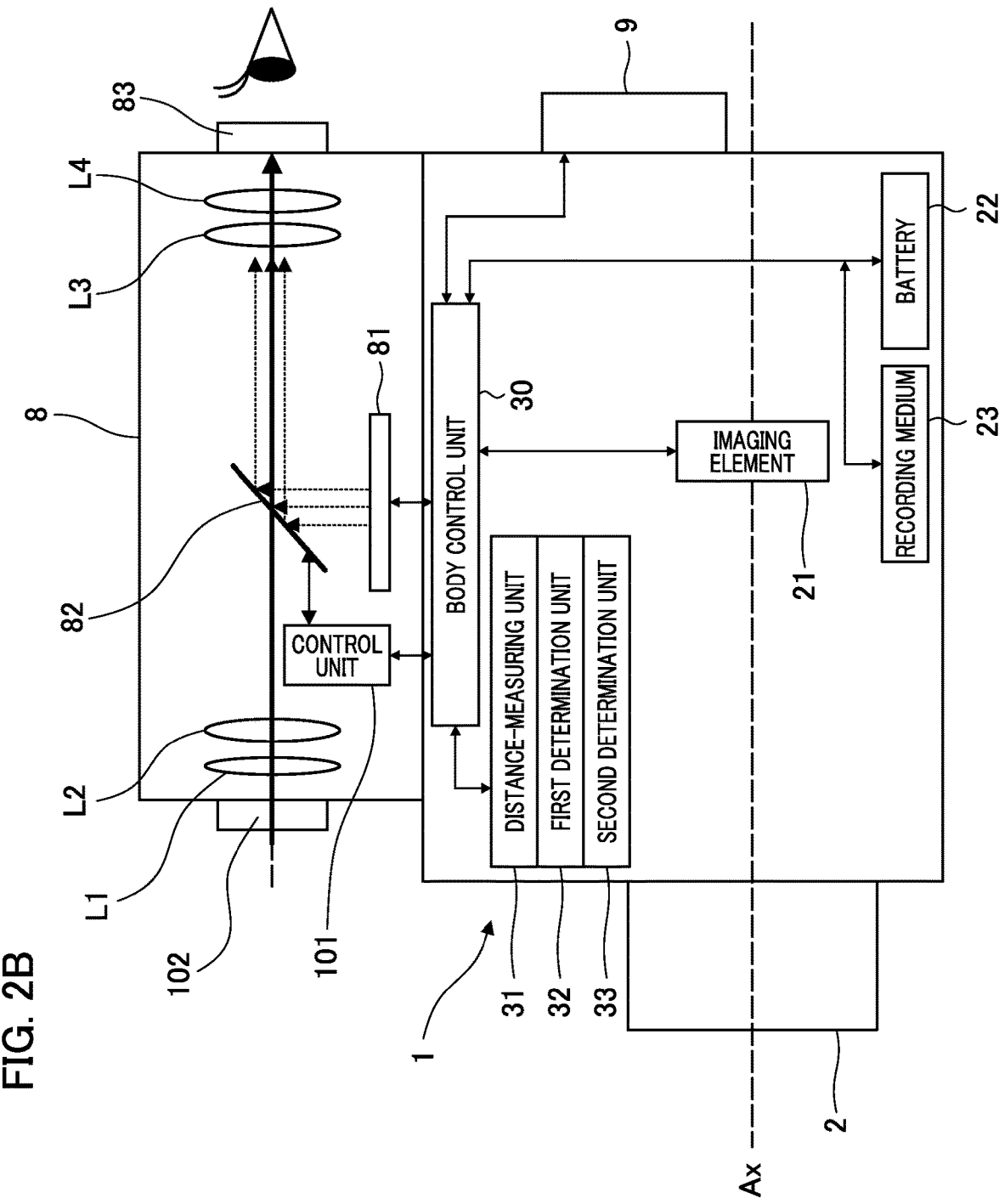

FIGS. 2A and 2B are block diagrams illustrating a configuration of the imaging device 1. FIG. 2A illustrates a state in which the composite display device 8 functions as a sighting device, and FIG. 2B illustrates a state in which the composite display device 8 functions as an electronic viewfinder. An optical axis of the imaging optical system is denoted by a one-dot chain line Ax.

The imaging element 21 performs photoelectric conversion on an optical image formed via the lens barrel unit 2 to generate an image signal. A charge-coupled device (CCD) image sensor, a complementary metal oxide semiconductor (CMOS) image sensor, or the like is used. A body control unit 30 includes a central processing unit (CPU), and integrally controls the constituents of the imaging device 1. By executing a predetermined program, the CPU performs a process of converting an image signal acquired by the imaging element 21 into digital information, a process of developing image data, a process of recording the image data on the recording medium 23, and the like.

The imaging device 1 includes an object distance-measuring unit 31, a first determination unit 32, and a second determination unit 33, and a main board, an auxiliary board, and the like (not illustrated) having processing circuits respectively corresponding to the units are mounted thereon. The object distance-measuring unit 31 measures a distance (subject distance) from the imaging device 1 to a subject on the basis of the principle of triangulation or the like. Alternatively, there is a method of acquiring distance information (depth information) from a plurality of pieces of image data from different viewpoints according to an imaging plane phase difference detection method using a split-pupil imaging device. An image deviation amount map calculated from a plurality of acquired images, a defocus amount map calculated by multiplying an image deviation amount by a predetermined conversion coefficient, and a distance map or a distance image obtained by converting a defocus amount into distance information of a subject can be generated. There is a time of flight (TOF) method of measuring a delay time from when light is projected onto a subject until when reflected light is received, and measuring a distance to the subject.

The first determination unit 32 determines features of a subject through image recognition. For example, a contour of the subject can be determined. The second determination unit 33 determines a main subject. The main subject is a main object in imaging among a plurality of subjects. For example, in a case where a plurality of subject images are detected in an imaging allowable range, it is possible to determine the main subject that is an imaging target from a method and a situation in which the imaging device 1 captures the subject.

The subject distance-measuring method performed by the distance-measuring unit 31 or the subject determination method performed by the first determination unit 32 and the second determination unit 33 are only an example, and other methods may be used. For example, in the first determination unit 32 and the second determination unit 33, a user may use operation input means such as the operation button 9 or the touch panel to explicitly give an instruction for an image region of a desired subject on a screen.

The composite display device 8 includes an organic EL panel 81, a plurality of lenses L1 to L4, a photochromic mirror 82, an eye window 83, an object window 102, and the like. With the electronic viewfinder function of the composite display device 8 (refer to FIG. 2B), the user can visually recognize display information of the organic EL panel 81 by looking through the eye window 83. It is possible to check a subject image or a captured image displayed on the organic EL panel 81.

On the other hand, with the sighting device function (refer to FIG. 2A) of the composite display device 8, the organic EL panel 81 projects a sighting mark 103 (refer to FIGS. 3A and 3B) onto the photochromic mirror 82 in a superimposed aspect with respect to light incident from the object window 102. Consequently, it is possible to assist in subject tracking. The imaging device 1 has a battery 22 as a power supply, and supplies a power supply voltage to each unit. The recording medium 23 records image data of an imaged subject and the like.

Next, a detailed configuration of the composite display device 8 will be described. The organic EL panel 81 is controlled by the body control unit 30, and the photochromic mirror 82 is controlled by a photochromic mirror control unit 101. The photochromic mirror 82 is a reflective optical element having a configuration in which an electrolyte containing silver fills between glasses with an ITO film (a type of transparent conductive film). By applying a voltage to the electrolyte, silver switches between the precipitation and elution, and thus switching between a mirror state and a half-mirror state can be performed. It is possible to adjust the transmittance of the half-mirror by adjusting a value of the voltage applied to the electrolyte in the half-mirror state. A piezoelectric thin film is formed on the surface of the photochromic mirror 82 of the present embodiment, and depending on a method of applying a voltage to the piezoelectric thin film, a shape thereof can change from a convex parabolic curved shape toward the front side to a flat state.

The photochromic mirror control unit 101 performs control for changing a voltage to be applied to the photochromic mirror 82 on the basis of a control signal from the body control unit 30. Consequently, control for switching the photochromic mirror 82 to the mirror state or the half-mirror state, control for changing the shape from a parabolically curved shape to a flat state, and vice versa are performed.

In a case where a first operation is performed by using the operation button 9, the composite display device 8 is set to function as an electronic viewfinder. In this case (refer to FIG. 2B), the photochromic mirror control unit 101 performs voltage control for making the photochromic mirror 82 in a mirror state and in a flat shape. On the other hand, the organic EL panel 81 displays predetermined image information on the photochromic mirror 82 on the basis of s control signal from the body control unit 30. The predetermined image information is image data recorded on the recording medium 23 or image data continuously acquired and generated by the imaging element 21, that is, so-called live view image information. Since the photochromic mirror 82 at this time is in a mirror state and has a flat shape, the light of the image displayed by the organic EL panel 81 is reflected by the photochromic mirror 82 toward the eye window 83. The user can visually recognize the displayed image through the eye window 83.

In a case where a second operation is performed by using the operation button 9, the composite display device 8 is set to function as a sighting device. In this case (refer to FIG. 2A), the photochromic mirror control unit 101 performs voltage control for making the photochromic mirror 82 in a half-mirror state and have a convex parabolic curved shape toward the front side. Incident light from the object window 102 is transmitted through the lenses L1 and L2, the photochromic mirror 82, and the lenses L3 and L4, and the user can visually recognize an object (subject) through the eye window 83.

Figure 3A:
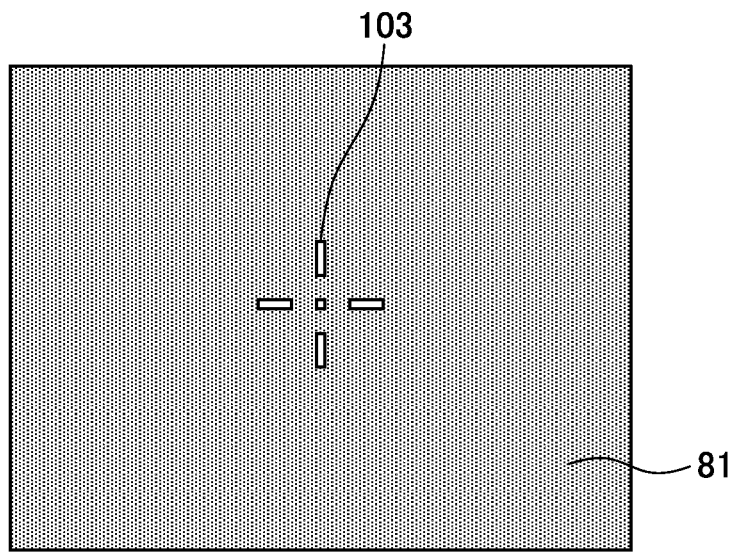
FIGS. 3A and 3B are diagrams illustrating a display example of a composite display device.

A case where the composite display device 8 is set to function as a sighting device will be described with reference to FIGS. 3A and 3B. FIG. 3A illustrates a display example of the organic EL panel 81, and FIG. 3B illustrates an example of a subject image visually recognized by the user through the eye window 83.

The object window 102 transmits light from the subject through the inside of the composite display device 8. The eye window 83 transmits light from the photochromic mirror 82 toward the outside of the composite display device 8. Specifically, both the object window 102 and the eye window 83 have a planar shape and are made of a material such as glass or plastic.

In a case where the sighting device function of the composite display device 8 is set, the organic EL panel 81 displays the sighting mark 103 as illustrated in FIG. 3A. The sighting mark 103 is displayed at a location corresponding to substantially the center of an angle of view captured by the imaging element 21, and other regions are displayed in black. Since the photochromic mirror 82 is in a half-mirror state, the photochromic mirror 82 transmits light from the object window 102 of the imaging device 1. The light of the sighting mark 103 displayed on the organic EL panel 81 is reflected from the photochromic mirror 82 toward the eye window 83 in an aspect of being superimposed on the incident light from the object window 102. At this time, since the photochromic mirror 82 has a concave parabolic curved shape toward the rear side, the light reflected by the photochromic mirror 82 becomes parallel light beams. In other words, the reflected image of the sighting mark 103 can be seen through the eye window 83 at a fixed position regardless of a position of the user's eyes.

Figure 3B:
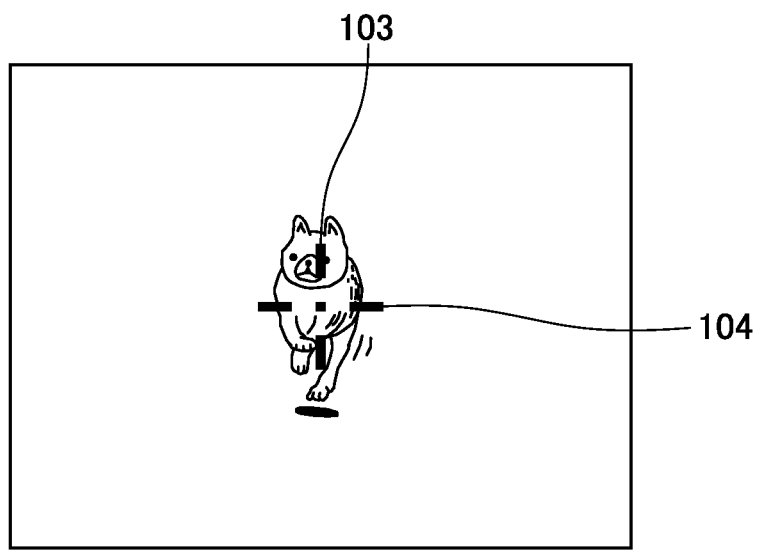

In FIG. 3B, the light of the sighting mark 103 is reflected by the photochromic mirror 82 and thus the sighting mark 103 can be visually recognized by the user (observer) through the eye window 83. As a subject 104, in the example in FIG. 3B, a dog is visually recognized by light from the object window 102.

The sighting mark 103 is preferably projected at the center of the optical axis of the lens barrel unit 2, that is, at a location corresponding to substantially the center of an angle of view captured by the imaging element 21 on the photochromic mirror 82. However, there is a deviation in the vertical direction of the imaging device 1 between a position of the composite display device 8 having a sighting device function and a position of the lens barrel unit 2, and deviations also occur in the respective optical axes. Thus, if the sighting mark 103 is simply projected onto the center of the photochromic mirror 82, the sighting mark 103 will not be projected onto a location corresponding to substantially the center of the angle of view captured by the imaging element 21, and thus a deviation occurs.

Figure 4:
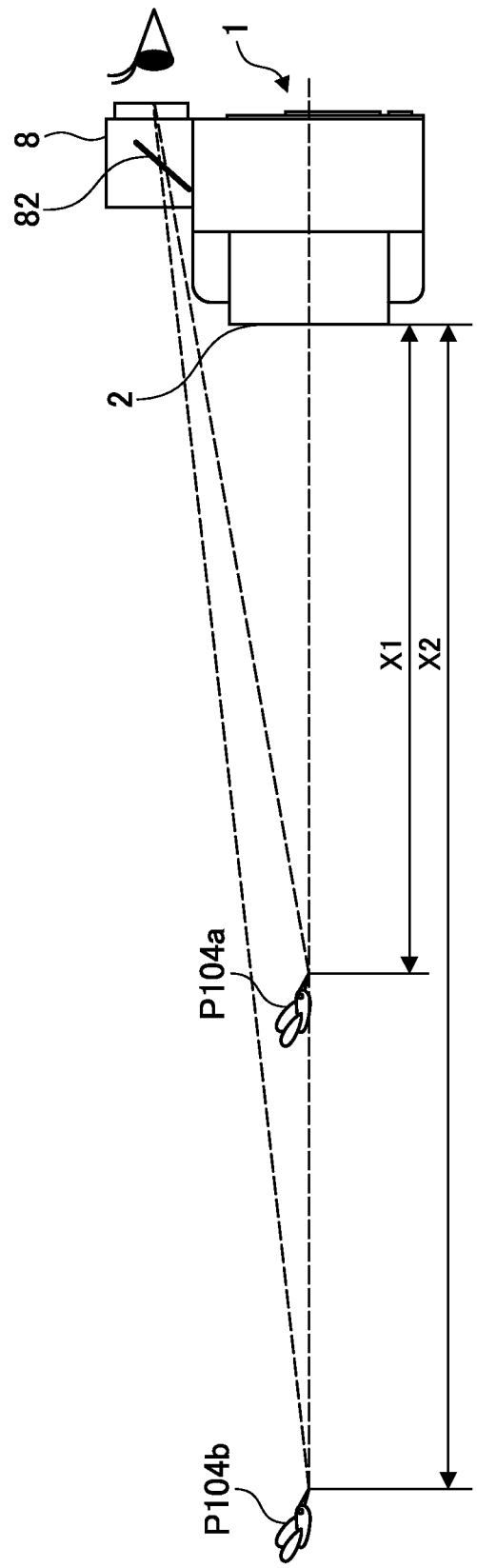
FIG. 4 is a diagram schematically illustrating a deviation between the center of an imaging optical system and a line of sight when a subject is viewed through an eyepiece.
Figure 5A:
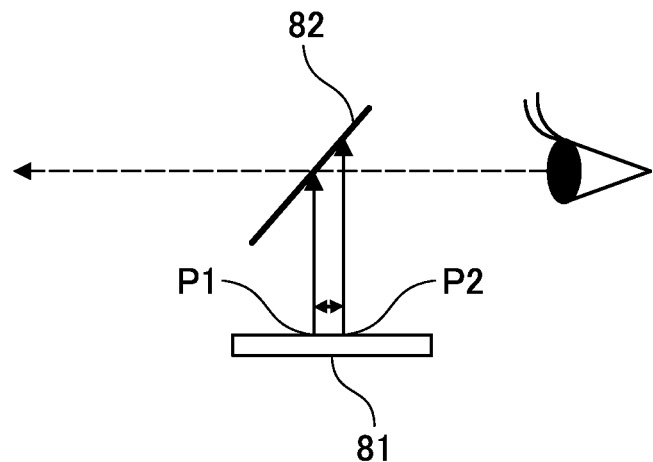
FIGS. 5A and 5B are diagrams schematically illustrating a sighting mark projected on a photochromic mirror.
Figure 5B:
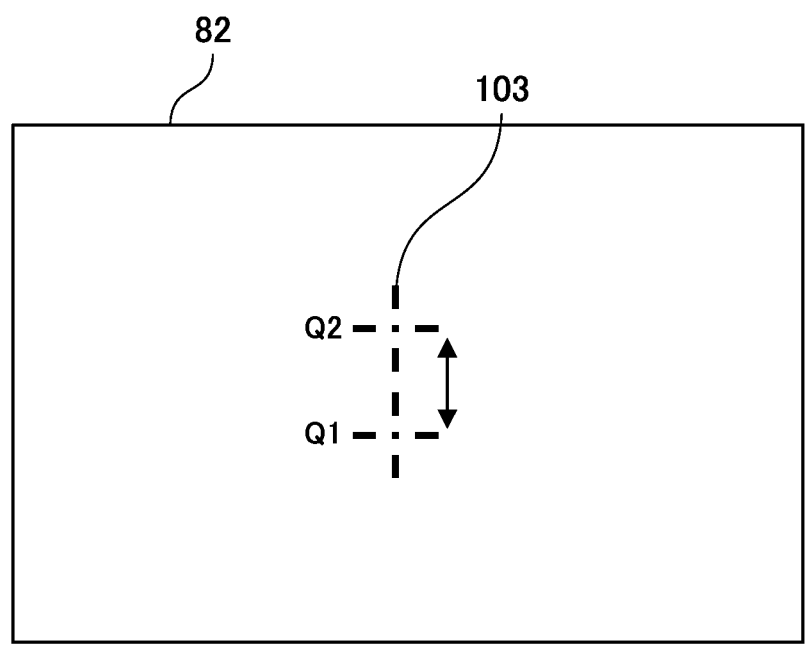
Figure 6A:
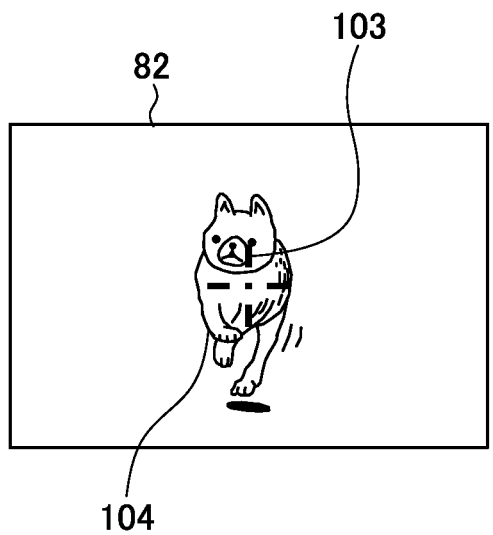
FIGS. 6A and 6B are diagrams illustrating an example of an image viewed through an eye window of the composite display device of the first embodiment.
Figure 6B:
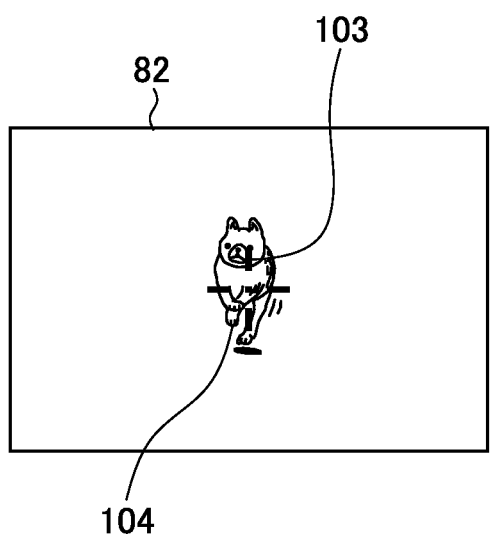

FIG. 4 is a diagram schematically illustrating a deviation between the center of the imaging optical system of the lens barrel unit 2 and a line of sight in a case where the user (observer) visually recognizes the subject 104 through the eye window 83. A first position P104a and a second position P104b as different positions of the subject 104 are exemplified. FIGS. 5A and 5V are schematic diagrams for describing the sighting mark 103 projected onto the photochromic mirror 82. FIG. 5A is a schematic diagram of a main portion of the sighting device as viewed from the side, and FIG. 5B is a schematic diagram of the main portion as viewed from a line-of-sight direction of an observer. FIGS. 6A and 6B are diagrams illustrating an example of an image visually recognized by an observer through the eye window 83 of the composite display device 8.

In a case where the subject 104 illustrated in FIG. 4 is located at the first position P104a, a distance from the imaging device 1 to the subject 104 is denoted by X1, and in a case where the subject 104 is located at the second position P104b, a distance from the imaging device 1 to the subject 104 is denoted by X2. In this example, "X1<X2".

The first determination unit 32 recognizes the subject 104, and the distance-measuring unit 31 determines that the recognized subject 104 is located at the distance X1 from the imaging device 1. In this case, the body control unit 30 adjusts the sighting mark 103 to a position P1 on the organic EL panel 81 illustrated in FIG. 5A. The position P1 is a preset position, and is set such that the position of the sighting mark 103 is set to match the position corresponding to the center of the imaging optical system of the lens barrel unit 2 in a case where it is determined that a distance to the subject 104 is the distance X1 from the imaging device 1. Consequently, the sighting mark 103 is projected onto a position Q1 as indicated by the crosshairs on the photochromic mirror 82 in FIG. 5B. In a case where the user looks through the eye window 83, the user can visually recognize the sighting mark 103 at a position substantially corresponding to the center of the angle of view captured by the imaging element 21 at the distance X1, as illustrated in FIG. 6A.

The body control unit 30 automatically adjusts a display position of the sighting mark 103 in a case where the position of the subject 104 changes. It is assumed that the first determination unit 32 recognizes the subject 104 and the distance-measuring unit 31 determines that the recognized subject 104 is located at the distance X2 from the imaging device 1. In this case, the sighting mark 103 is adjusted to a position P2 on the organic EL panel 81 illustrated in FIG. 5A. The position P2 is a position set such that the position of the sighting mark 103 matches the position corresponding to the center of the imaging optical system of the lens barrel unit 2 in a case where it is determined that a distance to the subject 104 is the distance X2 from the imaging device 1. Consequently, the sighting mark 103 is projected onto a position Q2 as indicated by the crosshairs on the photochromic mirror 82 in FIG. 5B. In a case where the user looks through the eye window 83, the sighting mark 103 can be visually recognized at a location substantially corresponding to the center of the angle of view captured by the imaging element 21 at the distance X2, as illustrated in FIG. 6B.

In the present embodiment, the display panel (organic EL panel 81) and the reflective optical element (photochromic mirror 82) are controlled in a display device that can switch between the electronic viewfinder function and the sighting device function. A position (projected position) of a projected indicator (sighting mark 103) can be automatically adjusted according to a subject distance by using the light source of the display panel. In other words, regardless of a subject distance, the sighting mark 103 is projected onto a location corresponding to substantially the center of the angle of view captured by the imaging element 21 on the photochromic mirror 82. Therefore, a user does not need to manually adjust a projected position of the sighting mark by using an operating member such as a dial.

Second Embodiment

A second embodiment of the present invention will be described with reference to FIG. 7. In the following description, the same reference numerals and symbols as those of the first embodiment are used, and detailed description thereof will be omitted, and description will focus on differences. This method of omitting descriptions is the same for embodiments that will be described later.

Figure 7:
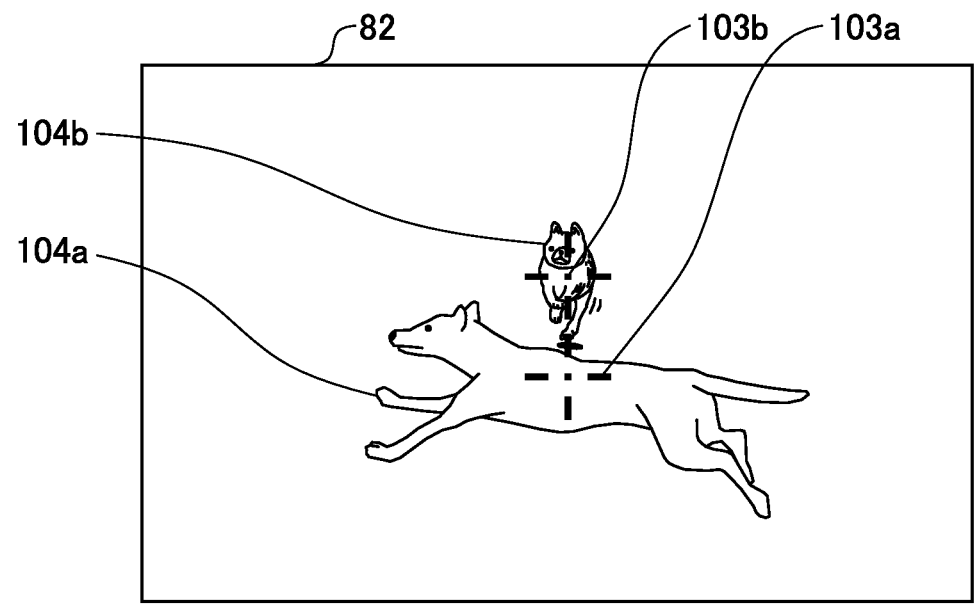
FIG. 7 is a diagram illustrating an example of an image viewed from an eye window of a composite display device of a second embodiment.

FIG. 7 illustrates an example of an image visually recognized by a user through the eye window 83 of the composite display device (sighting device) 8 of the present embodiment. An operation example in a case where the first determination unit 32 recognizes a plurality of subjects will be described. Subjects 104a and 104b at different distances from the imaging device 1 are illustrated. It is assumed that, in the imaging device 1, a first subject 104a is a subject at a relatively short distance X1 (refer to FIG. 4) and a second subject 104b is a subject at a relatively long distance X2 (refer to FIG. 4).

In a case where the first determination unit 32 recognizes a plurality of subjects 104a and 104b within an angle of view, the distance-measuring unit 31 determines a distance from the imaging device 1 to the subject for each recognized subject. It is determined that the first subject 104a is located at the distance X1, and the second subject 104b is located at the distance X2. A plurality of sighting marks 103 are respectively adjusted to positions P1 and P2 on the display panel illustrated in FIG. 5A and displayed at the set positions. That is, the sighting marks are projected onto the positions Q1 and Q2 on the photochromic mirror 82 illustrated in FIG. 5B. In a case where the user looks through the eye window 83, the sighting marks 103a and 103b can be visually recognized at substantially center positions within an imaging allowable range of the imaging device 1 as illustrated in FIG. 7. The sighting mark 103a is displayed at a first position on the screen corresponding to the distance X1, and the sighting mark 103b is displayed at a second position on the screen corresponding to the distance X2.

In the present embodiment, in a case where a plurality of subjects 104a and 104b are detected, the sighting marks 103 are respectively projected onto positions within an imaging allowable range corresponding to distances to the subjects as illustrated in FIG. 7. Even if the user is hesitant about selecting a main subject among a plurality of subjects, both subjects 104a and 104b can be tracked. Although an example of two subjects 104a and 104b has been described, the present embodiment can be applied even in a case where three or more subjects are detected, and the number of sighting marks is set according to the number of the detected subjects in that case. This also applies to embodiments that will be described later.

Third Embodiment

Figure 8:
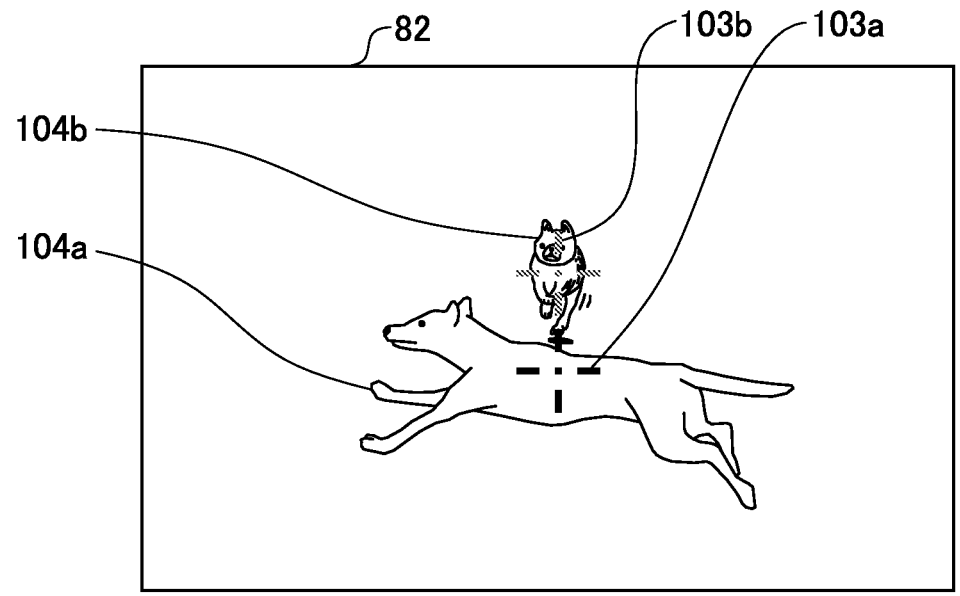
FIG. 8 is a diagram illustrating an example of an image viewed from an eye window of a composite display device of a third embodiment.

A third embodiment of the present invention will be described with reference to FIG. 8. FIG. 8 illustrates an example of an image visually recognized by a user through the eye window 83 of the composite display device (sighting device) 8 of the present embodiment. In the present embodiment as well, an operation example in a case where the first determination unit 32 recognizes a plurality of subjects 104a and 104b will be described.

In a case where the first determination unit 32 recognizes a plurality of subjects, the distance-measuring unit 31 determines a subject distance for each recognized subject. It is determined that the first subject 104a is located at the distance X1 (refer to FIG. 4), and the second subject 104b is located at the distance X2 (refer to FIG. 4). A plurality of sighting marks 103 are respectively adjusted to the positions P1 and P2 on the organic EL panel 81 illustrated in FIG. 5A. The second determination unit 33 determines a main subject from the plurality of subjects. The determination of the main subject is performed on the basis of a size of a subject image, a subject distance, a result of face recognition, user's operation instruction information, or the like. In a case where the subject 104a is determined as being a main subject, the body control unit 30 controls the organic EL panel 81 to perform control for displaying a sighting mark corresponding to the main subject and a sighting mark corresponding to the non-main subject in an identifiable manner. For example, the sighting mark 103a at the position P1 corresponding to the object 104a is displayed brighter than the sighting mark 103b at the position P2.

In the present embodiment, among the sighting marks corresponding to the plurality of subjects, the sighting mark corresponding to the determined main subject is projected relatively brightly. Therefore, it becomes easier to track the main subject when the user looks through the eye window 83. As a method other than changing brightness of display of the sighting mark, there is a method of displaying the sighting mark 103a corresponding to the main subject 104a to be larger than the sighting mark 103b corresponding to the subject 104b determined as not being the main subject. There is also a method of changing a display color, saturation, a shape, or the like, of a sighting mark so that the sighting mark corresponding to the main subject can be displayed in an identifiable manner. Alternatively, the sighting mark 103b does not have to be projected for the subject 104b determined as not being a main subject.

Fourth Embodiment

Figure 9A:
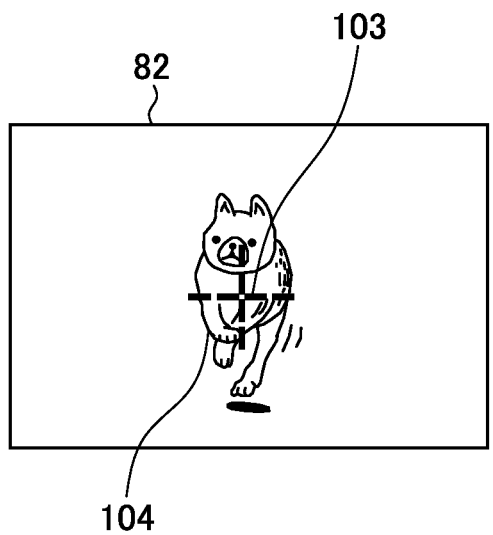
FIGS. 9A and 9B are diagrams illustrating an example of an image viewed from an eye window of a composite display device of a fourth embodiment.
Figure 9B:
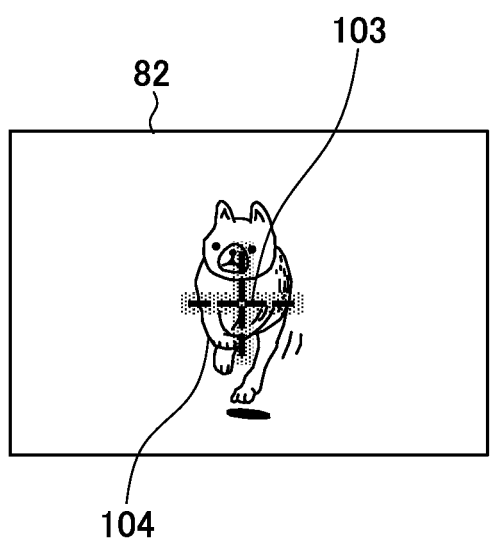

An imaging device 1 of a fourth embodiment of the present invention will be described with reference to FIGS. 9A and 9B. FIGS. 9A and 9B illustrate examples of images visually recognized by a user through the eye window 83 of the composite display device (sighting device) 8 of the present embodiment.

The first determination unit 32 recognizes the subject 104a, and the distance-measuring unit 31 determines that the recognized subject 104a is located at the distance X1 (refer to FIG. 4) from the imaging device 1. A display position of the sighting mark 103 is adjusted according to the subject distance. In a case where the above processing is completed, the body control unit 30 controls the organic EL panel 81 to change a display color or brightness of the sighting mark 103 as illustrated in FIG. 9A. Alternatively, as illustrated in FIG. 9B, the body control unit 30 controls the sighting mark 103 to blink.

According to the present embodiment, it is possible to notify the user in an identifiable manner whether or not the sighting mark 103 has been adjusted to the optimum position.

Other Embodiments

In each of the above embodiments, an example in which the subject 104 is determined through the determination process by the first determination unit 32 has been described, but a subject selected by a user may be determined by using operation input means such as the operation button 9 or a touch panel.

Although an example of an organic EL panel has been exemplified as a light source of the sighting mark 103, the present invention is not limited to this, and a light source provided in a display device such as a liquid crystal display panel may be used. A single light source such as a light emitting diode (LED) may be used. In that case, a slide mechanism for changing a position of the light source or a rotation mechanism for changing an irradiation angle of the light source is used. The body control unit 30 adjusts a display position of an indicator by controlling driving of a drive source (actuator or the like) of the slide mechanism or the rotation mechanism.

In addition to the example in which the composite display device 8 is configured integrally with the main body of the imaging device 1, there is a configuration in which the composite display device 8 is attachable to and detachable from the main body of the imaging device 1. In this case, in order to enable communication between the control unit 101 of the reflective optical element (photochromic mirror 82) and the body control unit 30, and between the display panel (organic EL panel 81) and the body control unit 30, the composite display device 8 and the imaging device 1 have wired or wireless communication means. The lens barrel unit 2 does not necessarily need to be fixed to the imaging device 1, and can be applied to a detachable lens imaging system, that is, a so-called interchangeable lens type imaging system.

An example of using the operation button 9 as operation means for switching between the electronic viewfinder function and the sighting device function of the composite display device 8 has been described. As other operation means, for example, in an example in which the display device 10 includes a contact detection device such as a touch panel, switching between the electronic viewfinder function and the sighting device function of the composite display device 8 is performed according to an operation on the touch panel.

Although the preferred embodiments of the present invention have been described above, the present invention is not limited to the above embodiments, and various modifications and changes are possible within the scope of the gist.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging device including a display device, comprising:
   an object window and an eye window;
   a display configured to display an indicator;
   an optical element configured to guide the indicator to the eye window; and
   at least one processor and/or circuit configured to function as following units:
      a first determination unit configured to detect a subject imaged by an imaging optical system and an imaging element,
      a measuring unit configured to measure a distance to the subject detected by the first determination unit; and
      a first control unit configured to adjust a display position of the indicator according to the distance to the subject measured by the measuring unit,
   wherein, in a case where the first determination unit detects a plurality of subjects, the measuring unit measures a distance for each subject, and the first control unit performs control to adjust a projected position of the indicator corresponding to each detected subject.

2. An imaging device including a display device, comprising:
an object window and an eye window;
a display configured to display an indicator;
an optical element configured to guide the indicator to the eye window; and
at least one processor and/or circuit configured to function as following units:
a first determination unit configured to detect a subject imaged by an imaging optical system and an imaging element,
a measuring unit configured to measure a distance to the subject detected by the first determination unit; and
a first control unit configured to adjust a display position of the indicator according to the distance to the subject measured by the measuring unit,
wherein the processor and/or circuit further function as a second determination unit configured to determine a main subject from a plurality of subjects in a case where the plurality of subjects are detected by the first determination unit, and
the first control unit controls the display to display a first indicator for the main subject determined by the second determination unit and a second indicator for a subject determined as not being the main subject by the second determination unit in an identifiable manner.

3. The imaging device according to claim 2, wherein the first control unit performs control for displaying the first and second indicators with different brightnesses, colors or sizes.

4. An imaging device including a display device, comprising:
an object window and an eye window;
a display configured to display an indicator;
an optical element configured to guide the indicator to the eye window; and
at least one processor and/or circuit configured to function as following units:
a measuring unit configured to measure a distance to a subject; and
a first control unit configured to adjust a display position of the indicator according to the distance to the subject measured by the measuring unit,
wherein the first control unit adjusts a projected position of the indicator, and then performs control for changing a brightness or a color of the indicator or for causing the indicator to blink.

* * * * *